April 18, 1944. A. H. LLOYD 2,346,851
MANUFACTURE OF SCREW-THREADING TAPS
Filed May 14, 1943

Inventor
Arthur H. Lloyd
by Mawhinney & Mawhinney
Attorneys

Patented Apr. 18, 1944

2,346,851

UNITED STATES PATENT OFFICE 2,346,851

MANUFACTURE OF SCREW-THREADING TAPS

Arthur Harold Lloyd, Coventry, England, assignor to Alfred Herbert Limited, Coventry, England Application May 14, 1943, Serial No. 487,051
In Great Britain June 4, 1942

9 Claims. (Cl. 51—288)

This invention relates to the production of taps for use in cutting screw-threads.

A centreless grinding machine (for example, of the form shown in my U. S. Patent No. 2,010,730) can be used for machining a continuous screw-thread in a workpiece, and more particularly for finish-grinding a pre-formed screw-thread, in a most economical way and with great accuracy, but it has not heretofore been possible to use a centreless grinding machine in the production of the screw-thread of a metal-cutting tap.

My main object is to provide means which will make this possible.

A method of machining the screw-thread of a tap in a centreless grinding machine, according to the invention, involves the steps of using a hardened, fluted blank and of filling the flutes of the blank with a softer material such as an alloy or a moulded material, the strips of the alloy or moulded material along the flutes (when set) being united at one end at least (beyond the adjacent end of the portion of the blank which is to be screw-threaded) by pieces of the alloy or moulded material. The whole can then be machined in a centreless grinding machine, and the softer material then removed by heating or in other ways, leaving a finished tap—subject to the provision of the leading chamfer, which is subsequently applied according as to whether the tap is a first tap, second tap or bottoming (or plug) tap. Preferably the blank has a pre-formed screw-thread on it, in which case the external periphery of the softer material should be provided with a screw-thread which exactly mates with the pre-formed screw-thread of the blank. This may be easily arranged by screwing a sleeve nut on the pre-formed thread, the sleeve being of a length sufficient to extend beyond both ends of the screw-threaded portion of the blank, and after one end of the sleeve has been closed by an asbestos washer or other means, the molten alloy can be poured in at the other end, or the moulding powder inserted under pressure and the whole heated as necessary. The sleeve nut may be built up of two or more parts which are longitudinally split to facilitate mounting or removal, the parts when assembled being held in position by means of an external band or sleeve.

Whilst there are many different alloys which may be used, the kind of alloy I prefer is one which melts at a temperature of about 150° centigrade—for example, a low-temperature solder comprising 40% tin, 40% lead and 20% bismuth, which melts at about 144° centigrade. If a mouldable material be used, it is preferably of the Bakelite type, of a kind which has a suitable hardness and which can be removed without heating to a temperature at which the hardening of the blank would be upset.

A preferred method of producing a screw-threaded tap will now be described with reference to the accompanying drawing, wherein.

Figure 2:
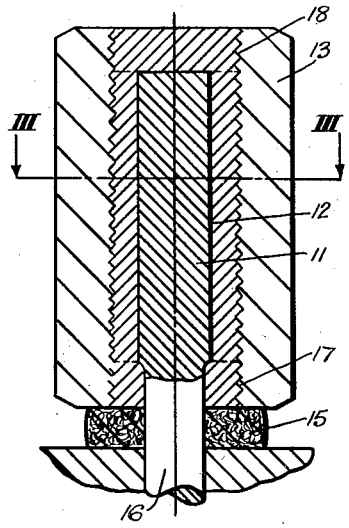
Figure 2 is a longitudinal section through a tap blank with a pre-formed screw-thread, showing how the alloy may be applied to its flutes and provided with a mating screw-thread.
Figure 3:
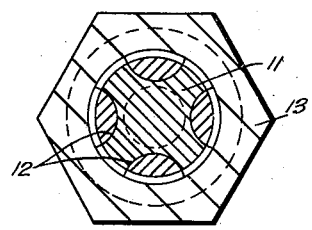
Figure 3 is a cross-section on line III—III of Figure 2.
Figure 4:
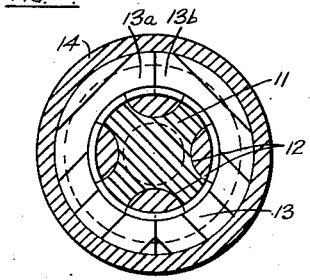
Figure 4 is similar to Figure 3, except that the nut is formed of longitudinally-split halves held together by a sleeve.

In the first place an unhardened unfluted blank 11 is first threaded by any known means, after which the flutes 12 are machined along the screw-threaded portion—usually four flutes for a ground-thread tap, but there may be only two or three flutes, or even more than four flutes, depending upon the type of tap required. The blank is then hardened. Next, an over-length sleeve nut 13 (which must, of course, be a good fit) is fitted thereon, as shown by Figures 2 and 3, to extend beyond both ends of the screw-threaded portion. In Figure 4 the nut halves 13a, 13b are held together by an encircling sleeve 14.) An asbestos or other form of closing washer 15 is then fitted round the shank 16 of the blank to close the lower end of the sleeve nut, leaving an annular space 17 between the closing washer and the adjacent end of the screw-threaded portion in the interior of the sleeve nut, and a suitable molten alloy is then poured from the other end so that it fills the annular space 17 and the flutes (which join the annular space) and also the space 18 at the other end of the sleeve nut beyond the upper end of the screw-threaded portion. When the alloy cools and sets the sleeve nut 13 can be removed by unscrewing (or removing the sleeve 14), leaving the flutes filled in solidly with the alloy, and the strips of the alloy in the flutes have portions of the screw-thread on their surfaces which mate up exactly with those of the blank. The strips of the alloy along the flutes are united to one another at their ends by the metal of the alloy beyond the ends of the screw-threaded portion of the blank (and these end portions in the spaces 17 and 18 continue the identical screw-thread), and the whole may therefore be finish-ground in a centreless grinding machine.

After the machining operation the finished article is heated to a temperature at which the alloy will run off, when the alloy can be collected for further use, or the ends of alloy can be cut off, after which the strips in the flutes can be readily removed.

Figure 1:
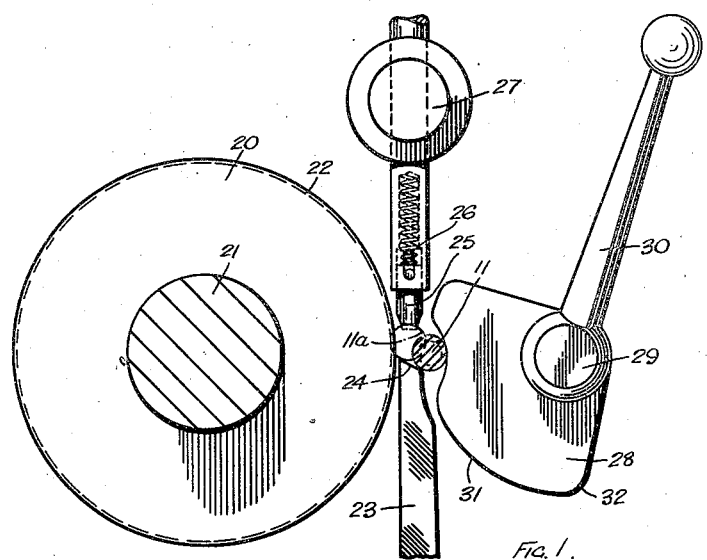
Figure 1 is a diagrammatic representation of a centreless grinding machine according to the patent aforesaid.

Figure 1 indicates diagrammatically one form of centreless grinding machine in which the blank can be finish-ground when its flutes have been filled with the alloy strips. The machine comprises a grinding wheel 20 fast on a rotating spindle 21, the periphery of the grinding wheel having similar annular ridges 22 which conform exactly to the shape of the thread required. To one side of the grinding wheel is a stationary support 23, for the blank, having a flat inclined upper end 24, and above this is a member 25 formed with teeth which can engage the screw-thread of the blank and serve for placing the latter into correct engagement with the grinding wheel, in respect of which the teeth are accurately positioned. The member 25 in this case is pressed downwardly by a spring 26, being carried by a stationary support 27. Instead of any backing wheel, the backing member 28 in this case is in the form of a cam on a spindle 29 fast with a handle 30.

The operator places the workpiece 11 in the position shown (in section) and then pulls the handle 30 downwardly, thereby forcing the workpiece to the position indicated by the dotted line 11a in which it is first engaged with the teeth on the plunger 25 and then with the ridges on the grinding wheel. The operator continues to pull the handle downwardly whilst the surface 31, which is arcuate about the axis of the spindle 29, presses the workpiece into contact with the grinding wheel, until the end 32 of the cam reaches the workpiece, when the latter can be withdrawn. During this movement the workpiece will be rotated by contact with the grinding wheel a few revolutions, depending upon its diameter, the speed of rotation of the grinding wheel, and the downward pressure exerted upon the handle 30, and, as will be well understood, it will travel axially a corresponding amount and the whole surface will be finish-ground. If necessary it can be re-inserted a second time, or even a third time or more, for treatment.

A further and very particular object of the present invention is to provide a ground-thread tap which is relieved on its cutting lands between the flutes in a very simple manner. This may be achieved, according to the present invention, by incorporating a sufficient resiliency in the centreless grinding machine by which the screw-thread on the tap is to be ground (if the grinding machine will allow of grinding from the solid) or the pre-formed screw-thread is to be finish-ground. The arrangement is such that the resiliency of the grinding machine enables the grinding wheel to sink slightly into the unhardened, relatively-soft, alloy or moulded material, and as soon as the grinding wheel meets a leading edge of the tap (along one side of a flute) it springs outwardly slightly and thereafter returns at a relatively low rate, thus providing the necessary relief, which is, of course, very small. Obviously this action will take place not merely in the case of a four-fluted tap (or of a tap with an even number of flutes—in which case both the grinding wheel and the backing member will encounter diametrically-opposite leading edges of the tap at the same time) but also in the case of a tap with an uneven number of flutes. The blank must, of course, be driven in the direction such that grinding begins at the leading or cutting edges of the lands.

The necessary resiliency can be provided by weakening, i. e., by reducing the rigidity of, the backing member, as necessary, or in other ways.

Thus, by means of the invention pre-formed taps can be finish-ground in a centreless grinding machine of the kind disclosed in the patent aforesaid, so that high-precision taps can be economically produced.

What I claim is my invention and desire to secure by Letters Patent of the United States is:

1. A method of preparing for machining the screw-thread of a tap in a centreless grinding machine, which involves the steps of using a hardened, fluted blank and of filling the flutes with a readily-removable, relatively-hard material, the strips of the said material along the flutes being united to one another at one end at least beyond the adjacent end of the portion of the blank which is to be screw-threaded.

2. A method of preparing for machining the screw-thread of a tap in a centreless grinding machine, which involves the steps of using a hardened, fluted blank and of filling the flutes with a readily-removable, relatively-hard material, the strips of the said material along the flutes being united to one another at both ends (beyond the adjacent ends of the portion which is to be screw-threaded) by pieces of the said material.

3. A method of preparing for finish-grinding a pre-formed screw-thread of a tap in a centreless grinding machine, which involves the steps of using a hardened fluted blank having a pre-formed screw-thread, filling the flutes with a relatively-hard, readily-removable material the strips of which along the flutes are united to one another at one end at least beyond the adjacent end of the pre-formed screw-thread, and providing the external periphery of the said material with a screw-thread which exactly mates with the pre-formed screw-thread of the blank.

4. The method of claim 1, which involves enclosing an appropriate portion of the blank in a sleeve, closing one end of the sleeve, and using as the said material an alloy which is poured into the other end of the sleeve in a molten condition and left to set.

5. The method of claim 3, which involves mounting a closing-fitting internally-threaded sleeve on the pre-formed screw-thread, the sleeve extending beyond one end of the screw-thread, closing one end of the sleeve, and using as the said material an alloy which is poured into the other end of the sleeve in a molten condition and left to set.

6. The method of claim 1, which involves enclosing an appropriate portion of the blank in a sleeve, closing one end of the sleeve, and using as the said material a mouldable powder which is inserted into the other end of the sleeve and treated as necessary to cause it to set.

7. The method of claim 3, which involves mounting a closing-fitting internally-threaded sleeve on the pre-formed screw-thread, the sleeve extending beyond one end of the screw-thread, and using as the said material a mouldable powder which is inserted into the other end of the sleeve and treated as necessary to cause it to set.

8. A method of finish-grinding a screw-threading tap, which involves filling its flutes with a relatively-hard, readily-removable material and then finish-grinding it in a centreless grinding machine.

9. A method of finish-grinding a screw-threading tap, which involves filling its flutes with a relatively-hard, readily-removable material which has more resiliency than the tap, and then finish-grinding it in a centreless grinding machine having a sufficient resiliency such that the lands of the tap will be relieved.

ARTHUR H. LLOYD.